(12) United States Patent
Kim et al.

(10) Patent No.: US 11,383,492 B2
(45) Date of Patent: Jul. 12, 2022

(54) OUTER PLATE OF REFRIGERATOR AND METHOD FOR MANUFACTURING THE SAME

(71) Applicant: LG ELECTRONICS INC., Seoul (KR)

(72) Inventors: Youngwoo Kim, Seoul (KR); Suhyun Lee, Seoul (KR); Hyesun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 626 days.

(21) Appl. No.: 16/106,620

(22) Filed: Aug. 21, 2018

(65) Prior Publication Data
US 2019/0054716 A1    Feb. 21, 2019

(30) Foreign Application Priority Data

Aug. 21, 2017    (KR) .................. 10-2017-0105168

(51) Int. Cl.
*B32B 15/09*    (2006.01)
*B32B 7/12*    (2006.01)
(Continued)

(52) U.S. Cl.
CPC ............... *B32B 15/09* (2013.01); *B32B 7/12* (2013.01); *B32B 15/00* (2013.01); *B32B 15/18* (2013.01);
(Continued)

(58) Field of Classification Search
CPC ......... B32B 15/09; B32B 15/18; B32B 15/00; B32B 7/12; B32B 37/12; B32B 38/145;
(Continued)

(56) References Cited

U.S. PATENT DOCUMENTS 4,232,090 A * 11/1980 Simon .................. C09D 167/00
428/424.4
2001/0019761 A1    9/2001 Iriyama
(Continued)

FOREIGN PATENT DOCUMENTS

CN    107325596    11/2017
JP    2000-254998    9/2000
(Continued)

OTHER PUBLICATIONS

European Search Report dated Jan. 7, 2019 issued in Application No. 18189882.6.
(Continued)

*Primary Examiner* — John D Freeman
(74) *Attorney, Agent, or Firm* — KED & Associates LLP

(57) ABSTRACT

Provided is an outer plate of a refrigerator. The outer plate of the refrigerator include a steel plate made of a metal material and having an outer surface on which a hairline is processed, a film layer made of a resin material and attached to a surface of the steel plate on which the hairline is provided, and a primer layer allowing the film layer to adhere to the steel plate. The primer layer includes an adhesion promoter for the adhesion between the steel plate and the film layer and a nano pigment for realizing a color while maintaining transparency of the primer layer, and when viewed from the outside of the refrigerator, the hairline that is visible through the primer layer and the film layer is visible together with the color of the primer layer.

9 Claims, 8 Drawing Sheets

(51) Int. Cl.
  *F25D 23/06*   (2006.01)
  *B32B 15/18*   (2006.01)
  *B32B 15/00*   (2006.01)

(52) U.S. Cl.
  CPC ........ *F25D 23/065* (2013.01); *B32B 2255/06* (2013.01); *B32B 2255/10* (2013.01); *B32B 2255/26* (2013.01); *B32B 2307/402* (2013.01); *B32B 2307/538* (2013.01); *B32B 2509/10* (2013.01)

(58) Field of Classification Search
  CPC .......... B32B 38/0012; B32B 2307/538; B32B 2038/0016; B32B 2255/26; B32B 2255/06; B32B 2255/10; B32B 2307/412; B32B 2509/10; B32B 2250/02; B32B 27/06; B32B 27/36; B32B 2307/402; B32B 2307/714; B32B 2307/752; B32B 2255/28; B32B 2307/536; B32B 15/08; B32B 27/16; F25D 23/065; F25D 23/066; F25D 2400/18; C09D 5/002; C09D 127/06; C09D 133/00; C09J 167/00
  See application file for complete search history.

(56) References Cited

U.S. PATENT DOCUMENTS

| | | | | |
|---|---|---|---|---|
| 2006/0147745 | A1* | 7/2006 | Choi | ........................ B05D 7/14 428/624 |
| 2014/0030488 | A1 | 1/2014 | Jung et al. | |
| 2014/0287257 | A1* | 9/2014 | Morishita | ................. C09D 5/08 428/556 |
| 2015/0174949 | A1* | 6/2015 | Lee | .......................... B32B 37/24 428/142 |
| 2017/0022340 | A1* | 1/2017 | Kim | ........................ B29C 66/45 |
| 2018/0257347 | A1* | 9/2018 | Washio | ................. B32B 27/281 |

FOREIGN PATENT DOCUMENTS

| | | | | |
|---|---|---|---|---|
| KR | 10-0156998 | | 1/1999 | |
| KR | 10-2001-0082107 | | 8/2001 | |
| KR | 10-2005-0023906 | | 3/2005 | |
| KR | 20090002567 | U * | 3/2009 | |
| KR | 200445926 | | 9/2009 | |
| KR | 10-2014-0009934 | | 1/2014 | |
| KR | 10-2015-0118047 | | 10/2015 | |
| KR | 10-2017-0067930 | | 6/2017 | |
| KR | 10-2017-0073278 | | 6/2017 | |
| KR | 101790499 | | 10/2017 | |
| KR | 10-2018-0058001 | | 5/2018 | |
| WO | WO 2012/138122 | | 10/2012 | |
| WO | WO-2013176219 | A1 * | 11/2013 | ............. C23C 2/006 |
| WO | WO-2015156638 | A1 * | 10/2015 | ............. B32B 38/00 |
| WO | WO-2017090679 | A1 * | 6/2017 | ............. B32B 23/04 |
| WO | WO 2017/179913 | | 10/2017 | |

OTHER PUBLICATIONS

Korean Office Action dated Nov. 30, 2021 issued in Application No. 10-2017-0105168.

* cited by examiner

OUTER PLATE OF REFRIGERATOR AND METHOD FOR MANUFACTURING THE SAME

CROSS-REFERENCE TO RELATED APPLICATIONS

The present application claims priority under 35 U.S.C. 119 and 35 U.S.C. 365 to Korean Patent Application No. 10-2017-0105168 (filed on Aug. 21, 2017), which is hereby incorporated by reference in its entirety.

BACKGROUND

The present disclosure relates to an outer plate of a refrigerator and a method for manufacturing the same.

In general, refrigerators are home appliances for storing foods at a low temperature in a storage space that is covered by a door. Here, the storing space is cooled using cool air that is generated by heat-exchanging with a refrigerant circulating a refrigeration cycle to store the foods in an optimal state.

The inside of the refrigerator may be classified into a refrigerating compartment and a freezing compartment. Accommodation members such as shelves, drawers, and baskets may be disposed within the refrigerating compartment and the freezing compartment. Also, each of the refrigerating compartment and the freezing compartment may be closed by a door. The refrigerator is classified into various types according to positions of the refrigerator compartment and the freezer compartment and configurations of the doors.

The refrigerator tends to increase in size more and more, and multi-functions are provided to the refrigerator as dietary life changes and pursues high quality, and accordingly, refrigerators having various structures and including convenience devices in consideration of user convenience are being developed, and also, refrigerators having elegant and various outer appearances are being brought to the market.

For example, an electronic product in which a fingerprint resistance coating layer is formed on a surface of a housing made of a metal base material on which a hairline is processed is disclosed in Korean Patent Publication No. 10-2017-0073278.

However, in the technique according to the related art, if no color is formed on the base material on which the outer hairline is formed, when a color layer is formed on a surface to impart a color, the hairline is not exposed to the outside but is covered. Thus, the proper texture of the metal represented by the hairline may not be realized.

In addition, when the color layer is formed to form the color on a top surface on which the hairline is formed, a surface of the color layer may be damaged by scratch due to external contact. Particularly, such limitations may be more serious in refrigerator which frequently comes into contact with a user.

SUMMARY

Embodiments provide an outer plate of a refrigerator, in which a hairline for realizing texture of a metal and a color are realized at the same time and a method for manufacturing the same.

Embodiments also provide an outer plate of a refrigerator, in which a color layer is protected, and a hairline is exposed to the outside, and a method for manufacturing the same.

Embodiments also provide an outer plate of a refrigerator, in which a manufacturing process is simple, and a manufacturing cost is reduced, and a method for manufacturing the same.

Embodiments also provide an outer plate of a refrigerator, which has texture and color of stainless steel, and a method for manufacturing the same.

In one embodiment, an outer plate of a refrigerator includes: a steel plate made of a metal material and having an outer surface on which a hairline is processed; a film layer made of a resin material and attached to a surface of the steel plate on which the hairline is provided; and a primer layer allowing the film layer to adhere to the steel plate, wherein the primer layer includes an adhesion promoter for the adhesion between the steel plate and the film layer and a nano pigment for realizing a color while maintaining transparency of the primer layer, and when viewed from the outside of the refrigerator, the hairline that is visible through the primer layer and the film layer is visible together with the color of the primer layer.

The steel plate may include a galvanized steel plate.

The hairline may be provided so that the steel plate has a surface roughness of about 8.0 Ra to about 1.1 Ra.

A preprocessed layer that prevents the hairline-processed portion from corroding and has chemical resistance may be further provided on a top surface of the steel plate on which the hairline is provided.

The nano pigment may have particles having a black color or a black-like color, each of which has a size of several ten nanometers to several hundred nanometers.

The primer layer may be printed on a bottom surface of the film layer that is continuously supplied.

The primer layer may have a thickness of about 4 μm to about 6 μm.

Paint for forming the primer layer may include a vinyl chloride resin, a modified acrylic resin, the nano pigment for realizing the color, and the nano pigment may contain a content of about 12% to about 15% with respect to the total amount of the paint.

The film layer may include a PET film.

An adhesive layer for adhesion with the primer layer may be further provided on a top surface of the steel plate on which the hairline is provided, and the adhesive layer may include a main resin made of a polyester material and an auxiliary resin made of an isocyanate material.

A hard coating layer, which has a hardness that satisfies a set hardness of a surface of a refrigerator door and is transparent, may be further disposed on a top surface of the film layer.

The hard coating layer may be made of an acrylic resin having fingerprint resistance.

The hard coating layer may include a matting agent for reducing gloss.

In another embodiment, a method for manufacturing an outer plate of a refrigerator, which includes: a steel plate made of a metal material and having an outer surface on which a hairline is processed; a film layer made of a resin material and attached to a surface of the steel plate on which the hairline is provided; and a primer layer allowing the film layer to adhere to the steel plate, wherein the primer layer includes an adhesion promoter for the adhesion between the steel plate and the film layer and a nano pigment for realizing a color while maintaining transparency of the primer layer, and when viewed from the outside of the refrigerator, the hairline that is visible through the primer layer and the film layer is visible together with the color of the primer layer, includes: supplying a roll-type steel plate;

forming a hairline on a front surface of the steel plate by using a processing member; supplying a roll-type film; forming a primer layer applied to one surface of the film, having an outer appearance color through which the hairline is visible, and adhering to an adjacent layer; and allowing a steel plate part, on which the hairline is formed, to adhere to a film part including the film layer on which the primer layer is applied, wherein, when the steel plate part and the film part adhere to each other, the primer layer is closely attached to the top surface of the steel plate on which the hairline is formed.

Paint for forming the primer layer may include: a pigment having a black color or a black-like color while the hairline is visible; and an adhesion promoter adhering between the steel plate and the film layer.

The processing member may include: a belt; and an abrasive provided on one surface of the belt and made of a silicon carbide material.

The method may further include forming a preprocessed layer having corrosion resistance and chemical resistance on a top surface of the steel plate on which the hairline is formed.

The method may further include applying an adhesive layer adhering to the primer onto a top surface of the steel late on which the hairline is formed.

The method may further include forming a hard coating layer formed on an outer surface and satisfying a hardness of a surface of the refrigerator door on a top surface of the film layer.

The steel plate part may be formed by continuously processing the hairline on the steel plate that is continuously supplied in a roll type, the film part may be formed by continuously printing paint for forming the primer layer on the film that is continuously supplied in the roll type, and the steel plate part and the film part may be combined with each other by lamination and wound in the roll type.

The details of one or more embodiments are set forth in the accompanying drawings and the description below. Other features will be apparent from the description and drawings, and from the claims.

DETAILED DESCRIPTION OF THE EMBODIMENTS

Hereinafter, detailed embodiments of the present disclosure will be described in detail with reference to the accompanying drawings. However, the scope of the present disclosure is not limited to proposed embodiments, and other regressive inventions or other embodiments included in the scope of the spirits of the present disclosure may be easily proposed through addition, change, deletion, and the like of other elements.

Figure 1:
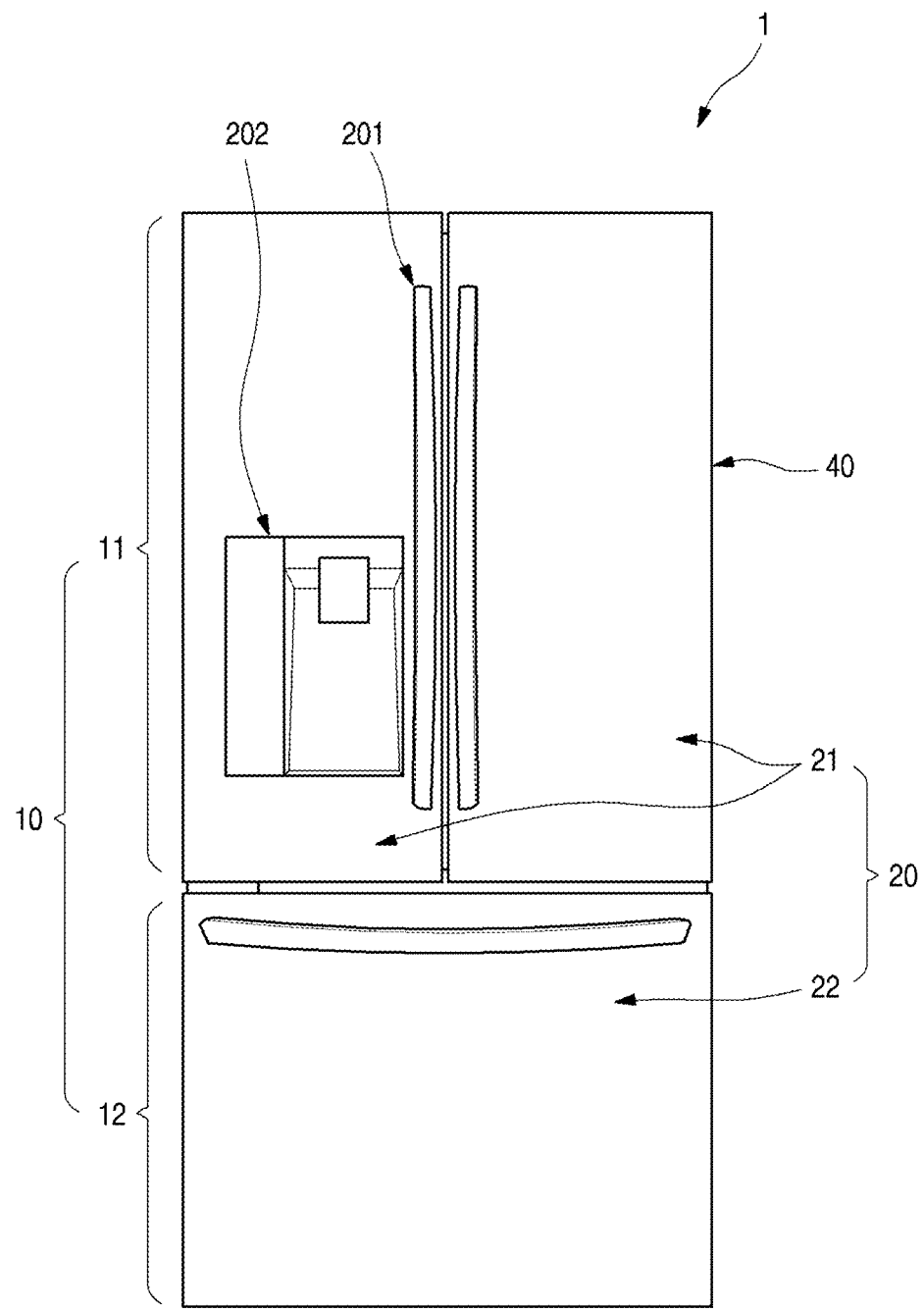
FIG. 1 is a front view of a refrigerator according to an embodiment.

FIG. 1 is a front view of a refrigerator according to an embodiment.

As illustrated in the drawing, a refrigerator 1 according to an embodiment includes a cabinet 10 defining a storage space and a door 20 mounted on a front surface of the cabinet 10. Here, an outer appearance of the refrigerator 1 is defined by the cabinet 10 and the door 20.

The inside of the cabinet 10 may be partitioned into a plurality spaces. As illustrated in the drawing, the inside of the cabinet 10 may be partitioned into two spaces to define a refrigerating compartment 11, which is provided at an upper side, and a freezing compartment 12, which is provided at a lower side.

Also, the door 20 may include a refrigerating compartment door 21 and a freezing compartment door 22, which respectively independently open and close the refrigerator compartment 11 and the freezer compartment 12. The refrigerating compartment door 21 may be provided in a pair at both left and right sides to open and close the whole or a portion of the refrigerating compartment 11 through rotation thereof. Also, the freezing compartment door 22 may be inserted and withdrawn in a drawer manner.

The configuration and arrangement of the storage spaces and the shape of the door 20 may be variously changed in addition to those shown in the drawing.

The door 20 may define an outer appearance of the front surface of the refrigerator 1 in a state in which the door 20 is closed. Also, the refrigerator 1 may have a structure of which the entire front surface is exposed to the outside due to installation characteristics. Thus, most of the outer appearance visible by a user may be defined by the door 20.

A door handle 201 that facilitates the opening/closing of the door 20 may be provided on the door 20. Also, a dispenser 202 through which water or ice is dispensed to the outside may be provided in one door of the plurality of doors 20.

Figure 2:
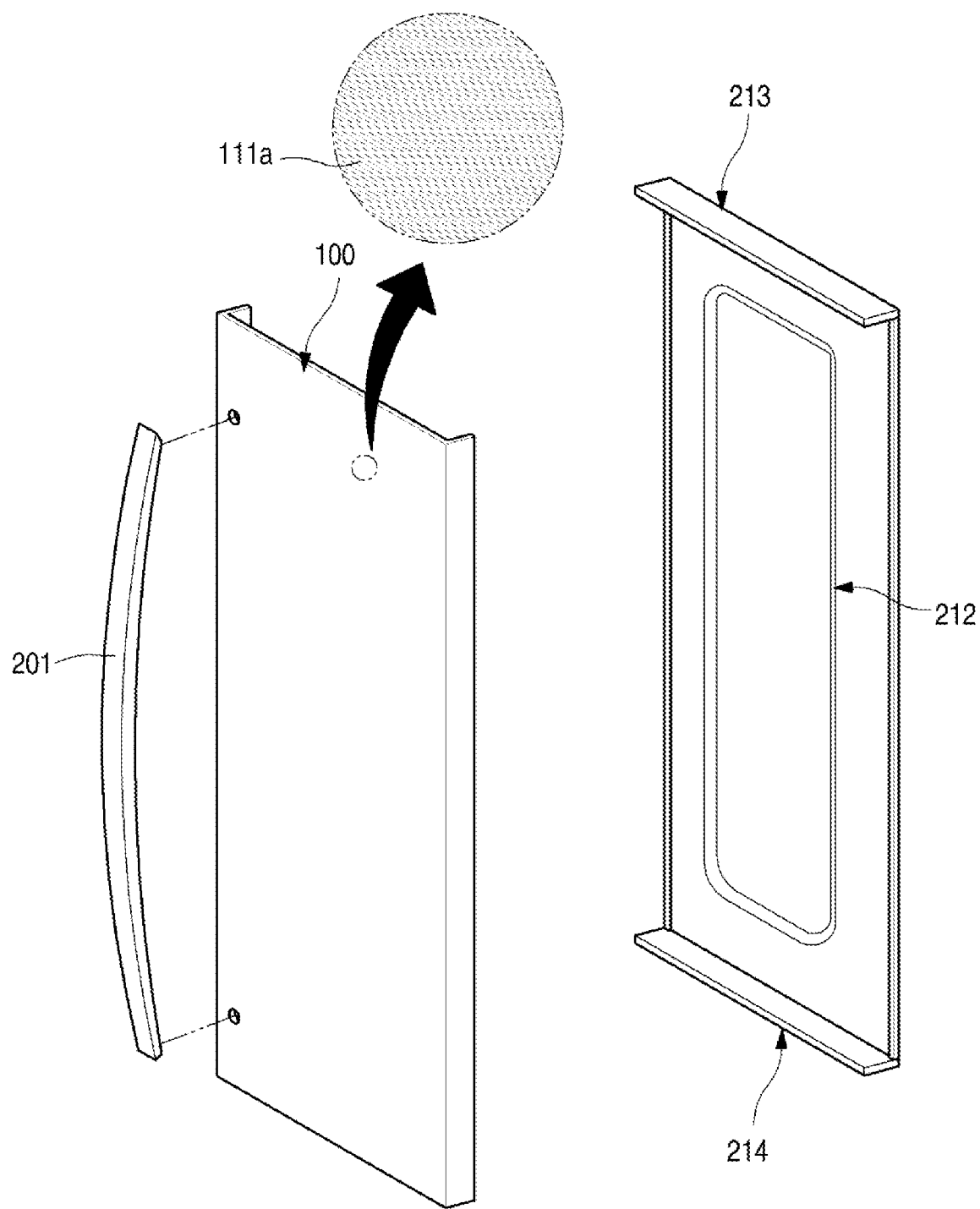
FIG. 2 is an exploded perspective view of a door of the refrigerator.

FIG. 2 is an exploded perspective view of the door of the refrigerator.

A structure of the door will now be described in more detail with reference to the drawings. For convenience of description, although the right door of the refrigerating compartment doors 21 has been described as an example in FIG. 2, the structure may be applied to all types of refrigerator doors.

The door 20 may include an outer plate 100 defining an outer appearance of the front surface thereof and a door liner 212 coupled to the outer plate 100 to define an outer appearance of a rear surface thereof. Also, top and bottom surfaces of the door 20 may be defined by an upper deco 213 and a lower deco 214, respectively.

The outer plate 100 may have a plate shape and be made of a metal material to define the front surface and a portion of a circumferential surface of the door 20. For example, as illustrated in FIG. 2, both ends of the outer plate 100 may be bent to define at least portions of both surfaces of the door 20.

The outer plate 100 may be made of an actual metal material such as stainless steel to realize an elegant outer appearance of the refrigerator. Also, to maximize real texture of the metal, a pattern of a hairline 111a may be provided on the outer plate 100 so that the pattern of the hairline 111a is visible from the outside. Also, the outer plate 100 may have a non-glossy black color to produce a more luxurious image. The outer plate 100 is not limited to the black color but may include dark colors similar to black, for example, s blue black color, a black brown color, a red black color, a dark navy color, a dark brown color, and the like.

The door handle 201 may be mounted on a front surface of the outer plate 100. The door handle 201 may have a bar shape. Also, upper and lower ends of the door handle 201 may be fixed to the outer plate 100, and at least a portion between the upper and lower ends may be spaced apart from the front surface of the outer plate 100 so that the user easily holds the door handle 201.

The door liner 212 may be made of a plastic material and define an outer appearance of a rear surface of the door 20. The door liner 212 may be formed to have a structure a gasket or a shelf mounted on the rear surface of the door 20 is capable of being mounted. A door dike vertically extending from both side ends may be disposed on the door liner 212. To realize such a complicated shape, the door liner 212 may be injection-molded with a plastic material.

The upper deco 213 may be coupled to an upper end of the outer plate 100 and an upper end of the door liner 212 to define the top surface of the door 20. The upper deco 213 may also be injection-molded with a plastic material.

The lower deco 214 may be coupled to a lower end of the outer plate 100 and a lower end of the door liner 212 to define the bottom surface of the door 20. The lower deco 214 may also be injection-molded with a plastic material.

A space may be defined in the door 20 by coupling the outer plate 100 to the door liner 212 and coupling the upper deco 213 to the lower deco 214. An insulation material (not shown) may be provided in the space. The insulation material may be formed by injecting a foam solution and be completely filled into the door 20 to allow the door 20 to be insulated. Thus, in the state in which the door is closed, the inside of the storage space may be insulated to maintain cold air within the refrigerator.

The structure of the outer plate 100 that defines the most of the outer appearance of the refrigerator 1, which is exposed to the outside in the state in which the door 20 is closed, will be described in more detail with reference to the accompanying drawings.

Figure 3:
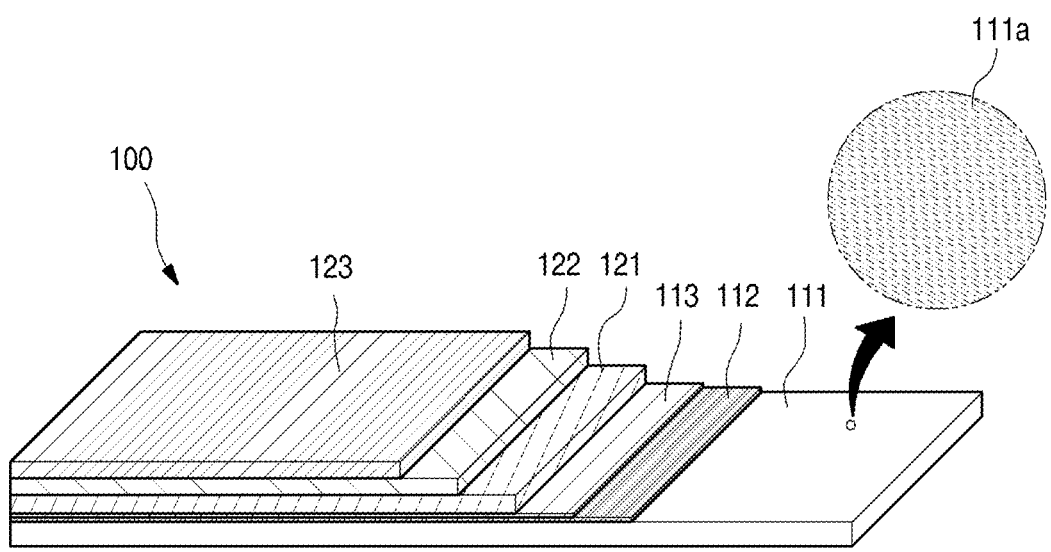
FIG. 3 is a schematic partial cutaway perspective view illustrating a configuration of an outer plate of the refrigerator according to an embodiment.
Figure 4:
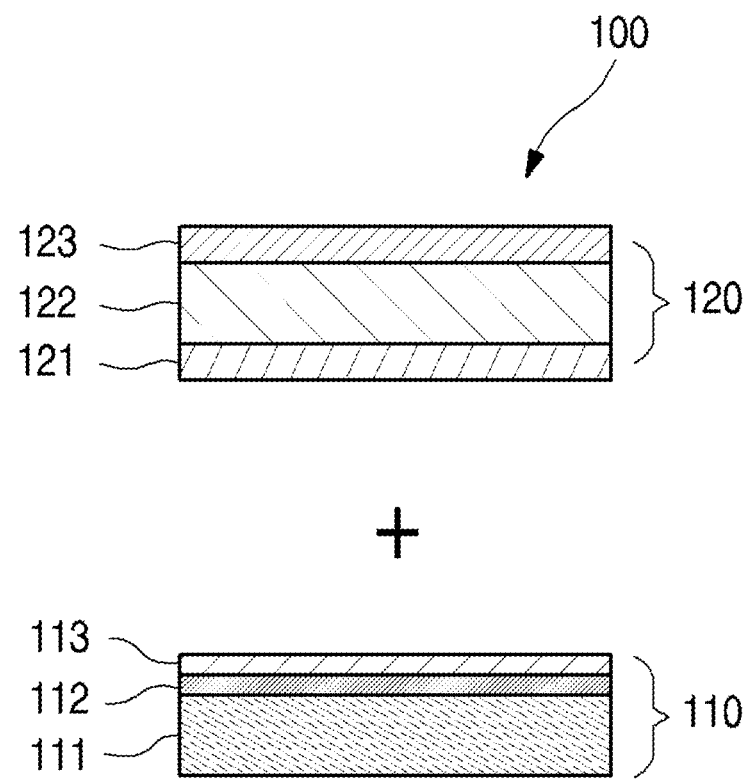
FIG. 4 is a cross-sectional view illustrating the outer plate of the refrigerator.

FIG. 3 is a schematic partial cutaway perspective view illustrating a configuration of an outer plate of the refrigerator according to an embodiment. Also, FIG. 4 is a cross-sectional view illustrating the outer plate of the refrigerator.

Hereinafter, a surface of the outer plate 100 in a direction that is directed toward the outside of the refrigerator with respect to the outer plate 100 may be defined as a front surface, and a surface of the outer plate 100 in a direction that is directed toward the inside of the refrigerator with respect to the outer plate 100 may be defined as a rear surface. Also, the front surface may be called a top surface, and the rear surface may be called a bottom surface.

As illustrated in the drawing, the outer plate 100 may be generally constituted by a steel plate part 110 and a film part 120. The steel plate part 110 and the film part 120 may be combined with each other to form the outer plate 100.

The steel plate part 110 may include a steel plate 111 made of a metal material and an adhesive layer 113 provided on a top surface of the steel plate 111. Also, the film part 120 may include a film layer 122, a primer layer 121 adhering to the adhesive layer 113 on a bottom surface of the filer layer 122, and a hard coating layer 123 disposed on a top surface of the film layer 122.

The outer plate 100 may have a black color or a black-based color in the state of being completely processed. A pattern of the hairline 111a may be exposed on the front surface of the outer plate 100. That is, the outer appearance of the front surface of the refrigerator 1 may be defined by the outer plate 100. Thus, the outer appearance may be looked like a stainless steel material having the black color, in which the pattern of the hairline 111a appears, and thus, a more luxurious appearance may be provided.

In more detail with respect to the steel plate part 110, a galvanized steel plate (GI, EGI) as a main component of the outer plate 100 may be used as the steel plate 111. The galvanized steel plate may have a feature that texture of the stainless steel is realized at a relatively low cost.

Also, the hairline 111a may be disposed on a surface of the steel plate 111, i.e., the front surface that is directed toward the outside of the refrigerator. The hairline 111a may maximize the real stainless texture of the outer plate 100 and have a fine size on the steel plate 111. Also, the hairline 111a may be continuously processed on the roll-type steel plate 111.

Since the hairline 111a is provided, the steel plate 111 may be processed so that a surface roughness (Ra: arithmetic average roughness) of the steel plate 111 is approximately 0.8 Ra to 1.1 Ra. Thus, the hairline 111a may be visible from the outside through the primer layer 121 and the hard coating layer 123. Particularly, the hairline 111a may be visible from the outside through the primer layer 121 having a color. Thus, the real stainless steel-like texture may be provided to the user.

A preprocessed layer 112 may be disposed on the surface of the steel plate 111 on which the hairline 111a is processed. The preprocessed layer 112 may be applied to the surface of the steel plate 111 in a preprocessing process after the hairline 111a of the steel plate 111 is processed with a thin film of oxide or inorganic salt on the surface of the steel plate 111. The preprocessed layer 112 may have corrosion resistance and chemical resistance to protect the surface of the steel plate 111 on which the hairline 111a is processed. Also, the adhesion of the primer layer 121 may be further improved by the preprocessed layer 112. The preprocessed layer 112 may be omitted as necessary.

Also, the adhesive layer 113 may be disposed on the top surface of the preprocessed layer 112. The adhesive layer 113 may be configured to allow the steel plate part 110 and the film part 120 to adhere to each other. The adhesive layer 113 may adhere to the primer layer 121.

In detail, the adhesive layer 113 may improve the adhesion between the steel plate 111 and the primer 121 when the steel plate part 110 and the film part 120, which are completely formed, are combined with each other. For this, the adhesive layer 113 may be provided by adding isocyanate to a main resin and an auxiliary region of a polyester material.

The steel plate part 110 may be formed by continuously processing the roll-type steel plate 111. That is, the hairline 111a may be formed on the surface of the steel plate 111 that is continuously supplied in the roll state, and then, the preprocessed layer 112 and the adhesive layer 113 may be continuously formed.

In more detail with respect to the film part of the outer plate 100, the film part 120 may include the film layer 122, the primer layer 121, the hard coating layer 123.

The film layer 122 may provide surface properties of the outer plate 100 and be made of a resin material to cover and protect the steel plate 111. The film layer 122 may prevent the steel plate 111 from corroding by moisture permeated into the steel plate 111 to protect the surface of the steel plate 111. The film layer 122 may be provided in the form of a PET resin film. The film layer 122 may be transparent so that the color of the primer layer 121 and the hairline 111a of the steel plate 111 are transmitted and visible from the outside.

The primer layer 121 may be disposed on a bottom surface of the film layer 122. The primer layer 121 may adhere to the adhesive of the steel plate part 110 to couple the steel plate part 110 to the film part 120 and simultaneously express the color of the outer plate 100. Thus, the primer layer 121 may be called a color layer.

In detail, the primer layer 121 may have a thickness of about 4 µm to about 6 µm. When the primer layer 121 has a thin thickness of about 4 µm or less, it may be difficult to sufficiently realize the black color. When the primer layer 121 has a thickness of about 6 µm or more, the hairline 111a, which is disposed at a lower side, may not be exposed or may be unclearly visible.

The primer layer 121 may perform the adhesion function and the color realization function at the same time. A paint for forming the primer layer 121 may include a vinyl chloride-based adhesion promoter or a modified acrylic-based promoter. Thus, more effective adhesion with the adhesive layer 113 and the film layer 122 may be realized.

Particularly, in the primer layer 121, a nano pigment may be used to realize the color or secure transparency. The nano pigment may be contained at a content of about 12% to about 15% with respect to the total amount of the pigment for forming the primer layer 121. Here, when the nano pigment is contained at a content of about 12% or less, the realization of the black color of the outer plate 100 may not be satisfied. When the nano pigment is contained at a content of about 15% or more, the hairline 111a may be covered and thus may not be sufficiently visible from the outside.

The black color of the primer layer 121 may be realized through the nano pigment, and simultaneously, the hairline 111a disposed below the primer layer 121 may be visible from the outside through the primer layer 121.

As described above, the nano pigment may have a nano size of several tens to several hundred nanometers to realize the black color and also may have transparency so that the hairline 111a disposed below the primer layer 121 is visible. Thus, the color may be realized on the layer for the adhesion by the primer layer 121 without adding a separate layer for realizing the color. That is, the primer layer 121 may realize the adhesion and the color at the same time.

The hard coating layer 123 may be disposed on the top surface of the film layer 122. The hard coating layer 123 may be transparent and thus be called a transparent coating layer. The hard coating layer 123 may provide surface of the outer plate 100 and be formed to satisfy a set hardness.

Due to the characteristics of the refrigerator door 20, frequent contact with a user's human body or a food container may not be avoided. Due to such characteristics of the refrigerator door 20, the outer plate 100 may have a suitable hardness.

Particularly, the primer layer 121 for realizing the color may be disposed below the hard coating layer 123 and the film layer 122 to prevent the portion for realizing the color or texture from being damaged by the scratch or the like. That is, when the external scratch occurs, the primer layer 121 and the hairline 111a may be protected by the hard coating layer 123 and the film layer 122 to prevent the hairline 111a from being directly damaged.

The hard coating layer 123 has to satisfy the hardness condition that is used for the outer appearance of the refrigerator door 20. Also, the hard coating layer 123 may be configured to satisfy fingerprint resistance so that stain such as a fingerprint does not remain on the surface of the outer plate 100 even when the user frequently contacts the hard coating layer 123.

The hard coating layer 123 may be made of various materials including a transparent acrylic resin and made of a material that satisfies the hardness and transparency. Also, if necessary, a matting agent may be added to realize a matte effect.

Hereinafter, a method for manufacturing an outer plate of a refrigerator having the above-described structure according to an embodiment will be described with reference to the accompanying drawings.

Figure 5:
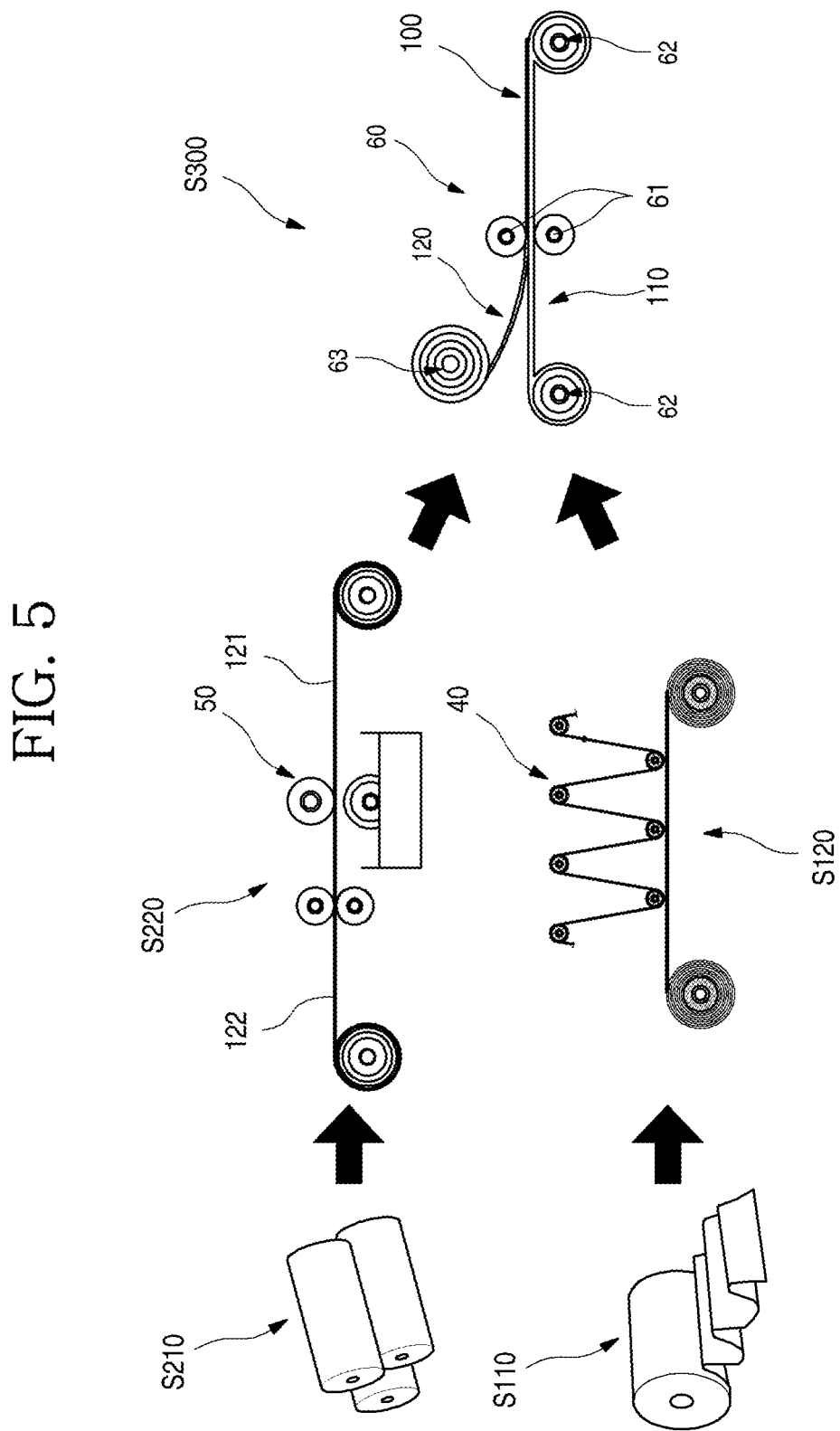
FIG. 5 is a view sequentially illustrating a method for manufacturing an outer plate of a refrigerator.
Figure 6:
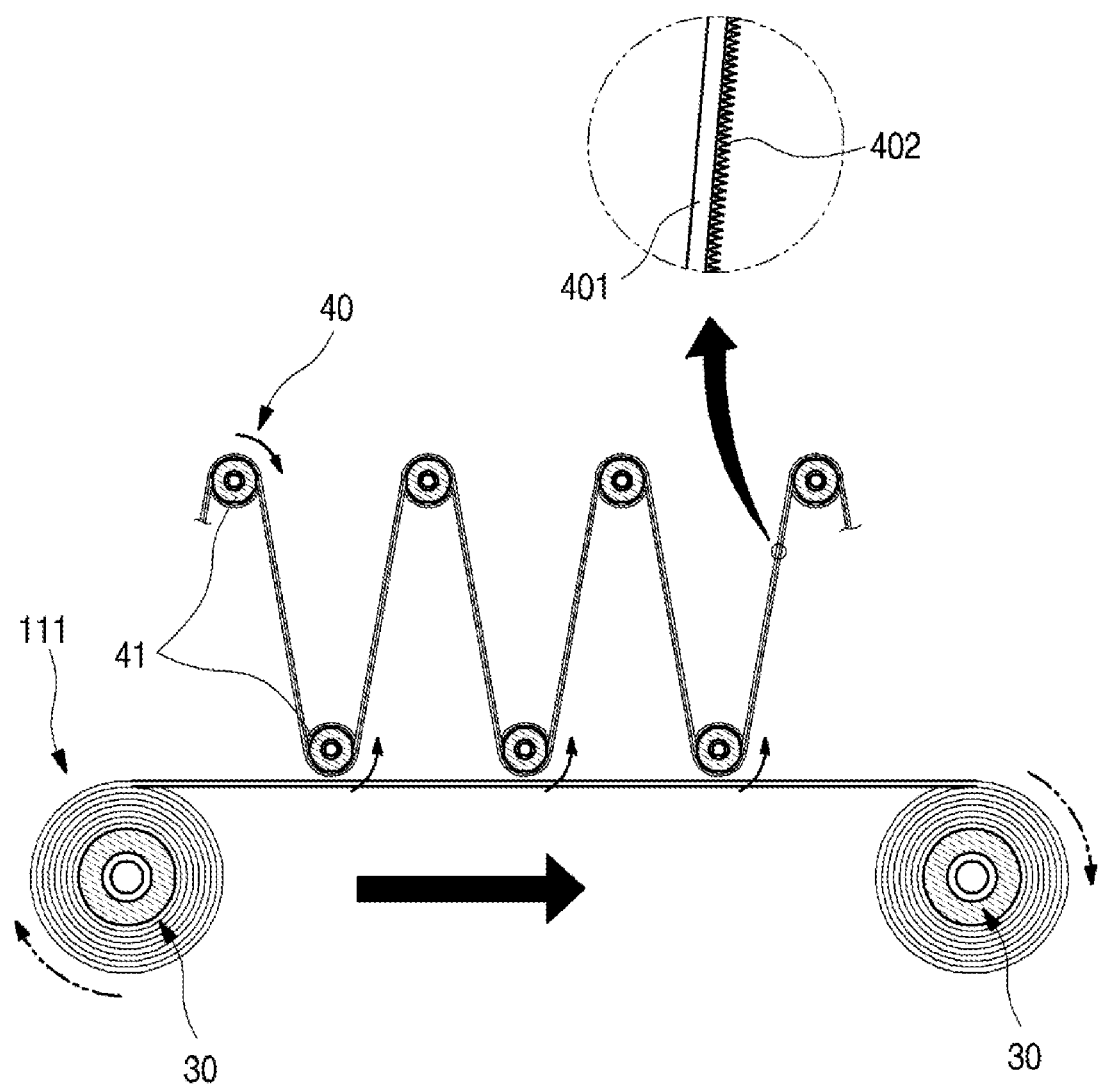
FIG. 6 is a schematic view illustrating a process of processing a hairline of the outer plate of the refrigerator.
Figure 7:
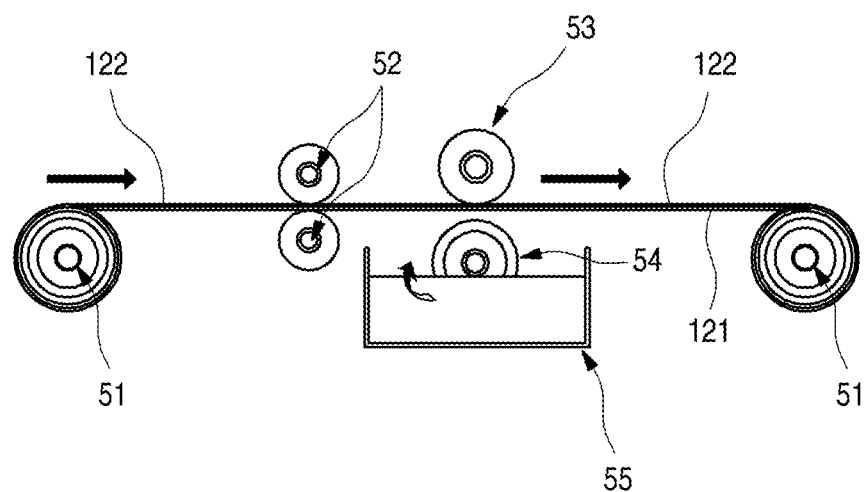
FIG. 7 is a schematic view illustrating a primer coating process of the outer plate of the refrigerator.

FIG. 5 is a view sequentially illustrating a method for manufacturing an outer plate of a refrigerator. FIG. 6 is a schematic view illustrating a process of processing a hairline of the outer plate of the refrigerator. FIG. 7 is a schematic view illustrating a primer coating process of the outer plate of the refrigerator.

As illustrated in the drawings, to manufacture the outer plate 100, a steel plate part 110 and a film part 120 may be independently formed and then adhere to each other to complete the outer plate 100. Here, the forming of the steel plate part 110 and the film part 120 and the adhesion between the steel plate part 110 and the film part 120 may be continuously performed.

In detail, to form the steel plate part 110, the steel plate 111 that is wound in a roll type may income. The steel plate 111 may income in a roll state so that continuous processing is performed by using a material of a galvanized steel plate.

Also, when the steel plate 111 is put in, the steel plate 111 may income in state in a state in which a back coating layer for preventing the rear surface of the steel plate from corroding and realizing chemical stability is formed. That is, the back coating layer may be supplied in a state of being formed by the manufacturer of the steel plate.

A hairline 111a may be processed on a front surface of the steel plate 111 that is in the roll state. The steel plate 111 may be continuously wound through a pair of transfer rollers 30. The steel plate 111 may contact a hairline processing member 40 disposed between the pair of transfer rollers 30 to process the hairline 111a on the surface of the steel plate 111.

The hairline processing member 40 may be provided in a belt type and rotatable while maintaining set tension by a plurality of processing rollers 41. Here, a portion of the rotating hairline processing member 40 may contact the surface of the steel plate 111, and the hairline 111a may be processed by an unevenness formed on a surface of the hairline processing member 40.

In more detail, as illustrated in FIG. 6, the hairline processing member 40 may have a belt structure having a predetermined area and form the hairline 111a by friction with the surface of the steel plate 111. Thus, the hairline processing member 40 may be called a sand paper. The hairline processing member 40 may be constituted by a belt 401 made of a fabric material and an abrasive 402 attached to one surface of the belt 401.

The belt 401 may have a length and width at which the belt 401 is capable of being installed on the processing roller 41 and may have a width corresponding to that of the steel plate 111. The belt 401 may be made of various materials that are capable of continuously processing the surface of the steel plate while maintaining the set tension as well as the fabric material.

The abrasive 402 may be made of silicon carbide so that a surface roughness of the steel plate 111 has a set surface roughness (about 8 Ra to about 1.1 Ra) by the hairline 111a formed on the surface of the steel plate 111. The silicon carbide may sufficiently form the hairline 111*a* on the surface of the galvanized steel plate having relatively low strength than that of stainless steel and thus be processed to satisfy the set roughness. Thus, the hairline 111*a* of the steel plate 111 may be clearly visible from the outside even in a state in which a primer layer 121 and a hard coating layer 123 are disposed at a front side thereof.

Also, the steel plate 111 may be continuously supplied by the processing roller 41. Here, the hairline processing member 40 may also continuously rotate to contact the surface of the steel plate 111, thereby continuously forming the hairline 111*a*.

After the hairline 111*a* is continuously processed on the surface of the steel plate 111, preprocessing coating may be performed to form a preprocessed layer 112. The preprocessing coating may be performed for applying the preprocessing layer 112 on the surface of the steel plate 111 on which the hairline 111*a* is formed. The preprocessing coating may be performed to form a thin film, thereby improving the adhesion between the steel plate 111 and the adhesive layer 113, preventing the surface of the steel plate 111, on which the hairline 111*a* is processed, from corroding, and protecting the surface of the steel plate 111. The preprocessed layer 112 may be applied to the front surface of the steel plate 111 while continuously supplying the roll-type steel plate 111 on which the hairline 111*a* is formed.

After the preprocessed layer 112 is completely formed, the adhesive layer 113 may be formed on a top surface of the preprocessed layer 112. The adhesive layer 113 may be formed by applying a paint for forming the adhesive layer 113 on the top surface of the preprocessed layer 11. Like the formation of the preprocessed layer 112, the adhesive layer 113 may be formed through coating in the state in which the roll-type steel plate is continuously supplied.

To form the film part 120, a PET film 122 for forming the film layer 122 is supplied first. The PET film 122 may be continuously supplied in a state of being wound in the roll state. In this embodiment, the film part and the PET film may be the same and thus expressed by the same reference numeral. However, the film layer 122 is not limited to the PET film. For example, a transparent resin film having the same property as the PET film may be used instead of the PET film.

Also, a paint for forming the primer layer 121 may be applied to a bottom surface of the PET film 122. Thus, the primer layer 121 may be formed on the bottom surface of the film layer 122. The primer layer 121 may be continuously applied to the bottom surface of the PET film 122 while the PET film 122 is continuously supplied.

In more detail, as illustrated in FIG. 7, the PET film 122 may be continuously supplied by a pair of film transfer rollers 51. Here, the PET film 122 may continuously move from one film transfer roller 51 to the other film transfer roller 51.

Also, a primer coating device 50 may be provided between the pair of film transfer rollers 51. The primer coating device 50 may include a supply roller 52, a guide roller 53, a printing roller 54, and an ink tank 55.

The supply roller 52 may be disposed vertically between the film transfer roller 51 and the ink tank 55 to supply the PET film 122. Thus, the supplied PET film 122 may be maintained at tension suitable for the coating of the paint (ink) so as to form the primer layer 121.

The ink tank 55 may be disposed below the transferred PET film 122 and receive the paint for forming the primer layer 121. Also, the printing roller 54 may be provided inside the ink tank 55. The printing roller 54 may contact the bottom surface of the PET film 122 and continuously print the paint within the ink tank 55 on the bottom surface of the PET film 122.

Also, the guide roller 53 may be disposed above the printing roller 54, and the guide roller 53 and the printing roller 54 may be vertically disposed at the same position. Thus, the PET film 122 may pass between the guide roller 53 and the printing roller 54. Therefore, the primer layer 121 may be printed on the bottom surface of the PET film 122 passing between the guide roller 53 and the printing roller 54, i.e., the bottom surface of the film layer 122. Thus, the primer layer 121 may be continuously formed on the PET film 122 that is continuously transferred.

The hard coating layer 123 may be formed on the top surface of the film layer 122 on which the primer layer 121 is formed. The hard coating layer 123 may be formed by continuously supplying and applying the roll-type PET film 122 on which the primer layer 121 is formed.

Although the hard coating layer 123 is formed through continuous coating after the primer layer 121 is formed, the hard coating layer 123 may be formed through coating before the primer layer 121 is formed.

Particularly, when the rolled PET film is supplied, the PET film 122 may be supplied in the state in which the hard coating layer 123 is formed first on the top surface thereof. In this case, the primer layer 121 may be printed on the PET film 122 on which the hard coating layer 123 is formed.

As described above, the steel plate part 110 and the film part 120 may be continuously supplied and processed from the initial incoming to the formation of the adhesive layer 113 and the formation of the primer layer 121 and the hard coating layer 123 in the state of being wound in the roll type.

Also, the plate part 110 and the film part 120, which are processed as described above may be laminated and combined by a combination device 60. Here, the steel plate part 110 may be continuously supplied through a pair of steel plate supply rollers 62. Also, the film part 120 may be supplied together with the steel plate through a separate film supply roller 63.

Also, the combination device 60 constituted by a pair of rollers may be disposed between the film supply rollers 63. The steel plate part 110 and the film part 120 may adhere to each other while passing through the combination device 60. Here, the adhesive layer 113 of the steel plate part 110 and the primer layer 121 of the film part 120 may be combined with each other through the lamination and then completely coupled to each other.

The steel plate that in in the state in which the steel plate part 110 and the film part 120 are coupled to each other may be transferred in the state of the wound state. Then, the steel plate may be cut and bent to have a size and shape corresponding to those of the outer plate 100 of the refrigerator door 20.

Also, the bent outer plate 100 may be assembled to form the refrigerator door 20.

In addition to the foregoing embodiment, various embodiments may be exemplified.

According to another embodiment, the hard coating layer may be omitted, and other constituents except for the hard coating layer may be the same as those according to the foregoing embodiment.

Hereinafter, another embodiment will be described with reference to the accompanying drawings, and the same constituent as that of the foregoing embodiments will be denoted by the same reference numeral, and its detailed description will be omitted.

Figure 8:
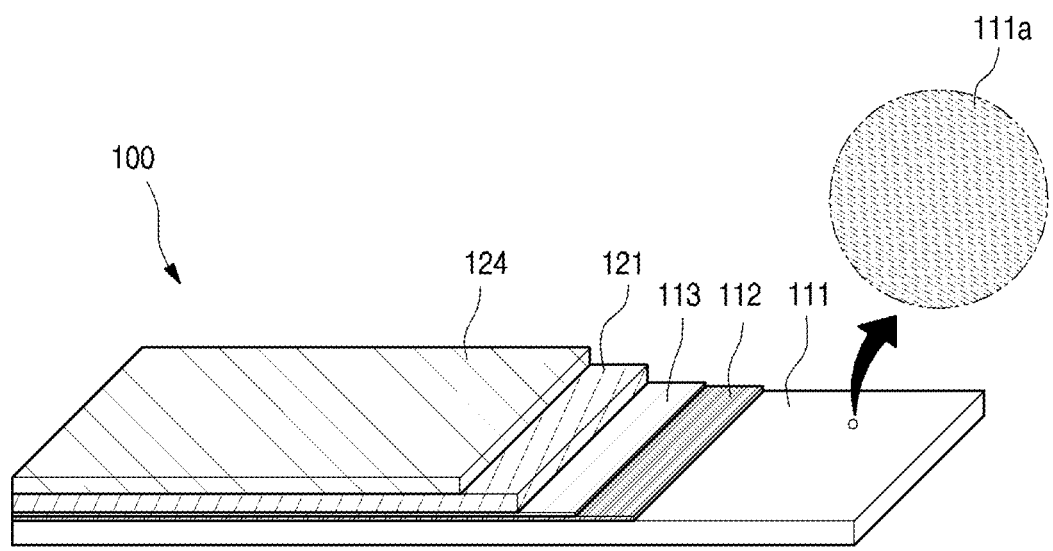
FIG. 8 is a schematic cutaway perspective view illustrating a configuration of an outer plate of a refrigerator according to another embodiment.
Figure 9:
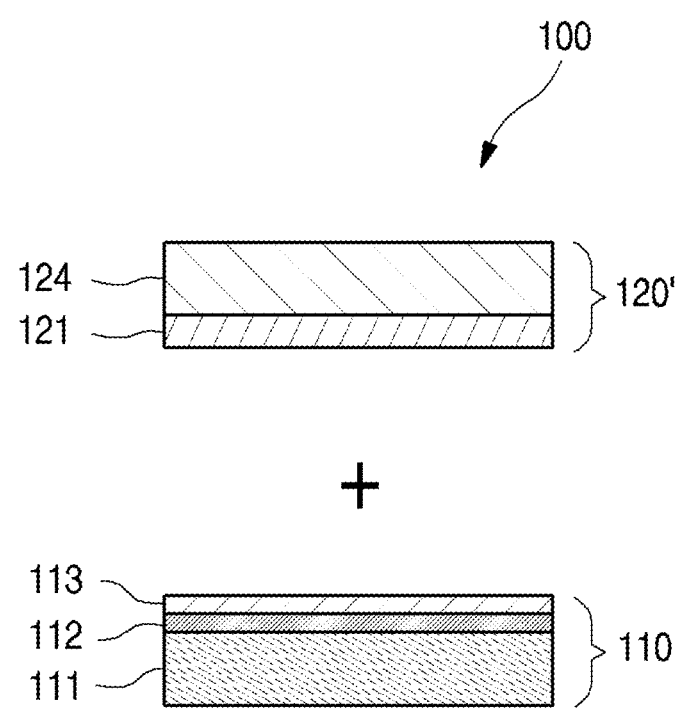
FIG. 9 is a cross-sectional view illustrating the outer plate of the refrigerator.

FIG. 8 is a schematic cutaway perspective view illustrating a configuration of an outer plate of a refrigerator according to another embodiment. Also, FIG. 9 is a cross-sectional view illustrating the outer plate of the refrigerator.

The outer plate 100 according to another embodiment may include a steel plate part 110 and a film part 120', which are separately formed. The steel plate part 110 and the film part 120', which are separately formed, may be combined with each other to form the outer plate 100.

The steel plate part 110 may include a roll-type steel plate 111 that is continuously supplied, and a hairline 111a may be provided on a surface of the steel plate 111. A preprocessed layer 112 may be disposed on a top surface of the steel plate 111, on which the hairline 111a is provided, to prevent the surface of the steel plate 111 from corroding and provide chemical resistance.

Also, an adhesive layer 113 may be disposed on a top surface of the preprocessed layer 112, i.e., the outermost top surface of the steel plate part 110. The adhesive layer 113 may include a polyester resin and a urethane curing agent so that the primer layer 121 and the steel plate 111 adhere to each other.

The plate part 110 may be configured so that the processing of the hairline 111a, the formation of the preprocessed layer 112, and the formation of the adhesive layer 113 are continuously performed through the continuous supply of the steel plate.

The film part 120' may include a film layer 124 made of a resin film such as PET to protect an outer appearance of the outer plate 100 by the film layer 124. The film layer 124 may be transparent and have a surface that is exposed to the outside.

The film layer 124 may provide the surface of the outer plate 100, which defines an outer appearance of the refrigerator 1. Thus, the film layer 124 may have a set hardness so as not to be damaged by frequent contact of a user. Thus, the film layer 124 may be made of a material having the set hardness in addition to transparency.

The primer layer 121 may be disposed on a bottom surface of the film layer 124. The primer layer 121 may be made of a mixture of a vinyl chloride resin and a modified acrylic resin so that the film layer 124 and the adhesive layer 113 adhere to each other.

Also, a nano pigment having a black color may be added to the primer layer 121. Thus, the outer plate 100 may have an outer appearance having a black color. Also, the hairline 111a disposed below the primer layer 121 may be visible through the primer layer 121. The nano pigment may have pigment particles, each of which has a size of several ten nanometers to several hundred nanometers. Thus, the primer layer 121 may have a color, and also, the hairline 111a may be visible through the primer layer 121.

The steel plate part 110 and the film part 120' may be combined with each other in the state in which each of the steel plate part 110 and the film part 120' is completely formed. Alternatively, the steel plate part 110 and the film part 120' may be combined with each other while the steel plate part 110 and the film part 120' are formed. When the steel plate part 110 and the film part 120' adhere to each other, the film layer 124 and the primer layer 121 may adhere to each other.

The steel plate part 110 and the film part 120' may adhere to each other, and thus, the outer plate 100 may have the outer appearance having the black color. Simultaneously, the hairline provided on the surface of the steel plate 111 may be visible to realize texture of stainless steel.

The outer plate of the refrigerator and the method for manufacturing the same according to the embodiment may have the following effects.

The color layer for realizing the color of the outer plate may be disposed on the primer layer, and the primer layer may adhere to the steel plate by the adhesive disposed on the steel plate. That is, the realization of the color and the adhesion between the layers may be enabled through the primer layer. Thus, the two functions may be realized through one layer.

Also, the color layer for realizing the color of the outer plate may be realized on the primer layer, and the hard coating layer may be disposed on the top surface of the primer layer so that the layer for realizing the color is protected by the hard layer. Thus, even though the surface of the outer plate is damaged by the scratch occurring due to the use characteristics of the refrigerator door, the primer layer for realizing the color may be prevented from being damaged to maintain the color and texture of the refrigerator as it is.

Also, the nano pigment may be used as the pigment used for realizing the color on the primer layer, and the hairline disposed below the primer layer may be exposed to the outside through the primer layer by the pigment. Thus, the texture of the hairline may be maintained on the outer plate while the outer plate has the color.

Also, the hairline may be processed to have the set roughness so that the hairline is visible from the outside through the primer layer and the hard coating layer event though the colored primer layer is disposed above the hairline. Thus, the texture of the hairline may be maintained on the outer plate while the outer plate has the color.

In addition, the hairline processed to have the set roughness may have the higher roughness than that in the conventional hairline processing. Thus, the texture of the hairline may be visible through the primer layer having the color from the outside as it is without being blurred.

In addition, the steel plate may income in the wound roll state and continuously supplied to continuously perform the processing of the hairline and the forming of the preprocessed layer, the primer layer, and the hard coating layer. Therefore, the productivity of the outer plate may be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An outer plate of a refrigerator, comprising:
    a steel plate having an outer surface on which a hairline pattern is processed;
    a polyethylene terephthalate (PET) film layer attached to the outer surface of the steel plate on which the hairline pattern is provided;
    a hard coating layer that is disposed on a top surface of the PET film layer and is transparent and provides an outer surface of the refrigerator; and
    a primer layer that directly contacts the PET film layer for allowing the PET film layer to adhere to the steel plate, wherein
- the primer layer comprises an adhesion promoter including a vinyl chloride resin and a modified acrylic resin for adhesion between the steel plate and the PET film layer and a nano pigment for realizing a color while maintaining transparency of the primer layer,
- the nano pigment is contained in an amount of 12% to 15% with respect to a total weight of a paint for forming the primer layer,
- the hairline pattern is provided so that the steel plate has an arithmetic average roughness (Ra) of 0.8 µm to 1.1 µm, and
- when viewed from the outside of the refrigerator, the hairline pattern that is visible through the primer layer and the PET film layer is visible together with the color of the primer layer.

2. The outer plate according to claim 1, wherein the steel plate comprises a galvanized steel plate.

3. The outer plate according to claim 1, wherein a preprocessed layer that prevents the hairline pattern-processed portion from corroding and has chemical resistance is further provided on a top surface of the steel plate on which the hairline pattern is provided.

4. The outer plate according to claim 1, wherein the nano pigment has particles having a black color, each of which has a size of several ten nanometers to several hundred nanometers.

5. The outer plate according to claim 1, wherein the primer layer is printed on a bottom surface of the PET film layer.

6. The outer plate according to claim 1, wherein the primer layer has a thickness of 4 µm to 6 µm.

7. The outer plate according to claim 1, wherein an adhesive layer for adhesion with the primer layer is further provided on the outside surface of the steel plate on which the hairline pattern is provided, and
- the adhesive layer comprises a main resin made of a polyester material and an auxiliary resin made of an isocyanate material.

8. The outer plate according to claim 1, wherein the hard coating layer is made of an acrylic resin having fingerprint resistance.

9. The outer plate according to claim 1, wherein the hard coating layer comprises a light extinction agent for reducing gloss.

* * * * *